United States Patent
Inoue

(10) Patent No.: US 10,549,696 B2
(45) Date of Patent: Feb. 4, 2020

(54) IMAGE DISPLAY APPARATUS FOR DISPLAYING A VIEW OUTSIDE A VEHICLE AS ACTIVATED WHEN OCCUPANT GETS OUT OF THE VEHICLE

(71) Applicant: TOYOTA JIDOSHA KABUSHIKI KAISHA, Toyota-shi (JP)

(72) Inventor: Shimon Inoue, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/954,676

(22) Filed: Apr. 17, 2018

(65) Prior Publication Data

US 2018/0312114 A1  Nov. 1, 2018

(30) Foreign Application Priority Data

Apr. 28, 2017 (JP) ................. 2017-089690

(51) Int. Cl.
*B60R 1/12* (2006.01)
*H04N 7/18* (2006.01)
*B60N 5/00* (2006.01)

(52) U.S. Cl.
CPC .............. *B60R 1/12* (2013.01); *B60N 5/00* (2013.01); *H04N 7/181* (2013.01); *H04N 7/188* (2013.01); *B60R 2001/1253* (2013.01); *B60R 2300/105* (2013.01); *B60R 2300/20* (2013.01); *B60R 2300/404* (2013.01); *B60R 2300/70* (2013.01); *B60R 2300/8046* (2013.01); *B60R 2300/8066* (2013.01)

(58) Field of Classification Search
CPC ......... B60R 1/12; B60R 1/00; B60R 2300/40; B60R 2300/70; B60R 2300/404; B60R 2300/105; B60R 2300/20; B60R 2300/8046; B60R 2001/1253; B60R 2300/8066; H04N 7/181; H04N 7/188
USPC ........................................ 348/148
See application file for complete search history.

(56) References Cited

U.S. PATENT DOCUMENTS

2003/0209893 A1* 11/2003 Breed ................ B60J 10/00
                                                          280/735
2006/0111819 A1*  5/2006 Servera Serapio ..... B60R 1/00
                                                          701/28

(Continued)

FOREIGN PATENT DOCUMENTS

DE  10 2012 004 640 A1   9/2013
DE  10 2013 000 645 A1   4/2014

(Continued)

*Primary Examiner* — Marnie A Matt
(74) *Attorney, Agent, or Firm* — Oblon, McClelland, Maier & Neustadt, L.L.P.

(57) ABSTRACT

An image display apparatus includes: cameras each configured to take an image representing a view outside a vehicle; displays each configured to display the image taken by a corresponding one of the cameras; and a controller configured to control the cameras and the displays. The controller detects a first action that is a preliminary action taken by an occupant of the vehicle to get out of the vehicle in a state in which the cameras and the displays are not activated. When the first action is detected, the controller activates at least one of the cameras and at least one of the displays and control the at least one of the displays to display an image taken by the at least one of the cameras.

11 Claims, 7 Drawing Sheets

(56) References Cited

U.S. PATENT DOCUMENTS

| | | | | |
|---|---|---|---|---|
| 2009/0115846 | A1* | 5/2009 | Ohue | B60R 11/04 |
| | | | | 348/148 |
| 2010/0238288 | A1* | 9/2010 | Klaerner | B60Q 1/0023 |
| | | | | 348/148 |
| 2012/0065858 | A1* | 3/2012 | Nickolaou | B60Q 9/008 |
| | | | | 701/70 |
| 2016/0152211 | A1* | 6/2016 | Owens | B60R 25/102 |
| | | | | 348/36 |
| 2017/0066375 | A1* | 3/2017 | Kato | H04N 7/181 |
| 2017/0318267 | A1* | 11/2017 | Kim | B60R 1/00 |
| 2018/0086268 | A1* | 3/2018 | Kochiya | H04N 5/23241 |
| 2018/0137595 | A1* | 5/2018 | Kim | B60Q 9/008 |

FOREIGN PATENT DOCUMENTS

| | | |
|---|---|---|
| DE | 10 2015 009 184 A1 | 1/2016 |
| DE | 10 2015 106 304 A1 | 10/2016 |
| JP | 2007-148618 | 6/2007 |
| JP | 2009-40113 | 2/2009 |
| JP | 2009-83613 | 4/2009 |
| JP | 2009-83618 A | 4/2009 |
| JP | 2016-220011 | 12/2016 |
| WO | WO 2016/169912 A1 | 10/2016 |

\* cited by examiner

IMAGE DISPLAY APPARATUS FOR DISPLAYING A VIEW OUTSIDE A VEHICLE AS ACTIVATED WHEN OCCUPANT GETS OUT OF THE VEHICLE

CROSS REFERENCE TO RELATED APPLICATION

The present application claims priority from Japanese Patent Application No. 2017-089690, which was filed on Apr. 28, 2017, the disclosure of which is herein incorporated by reference in its entirety.

BACKGROUND

The following disclosure relates to an image display apparatus configured to take an image representing a view outside a vehicle and display the taken image on a display.

There is known an image display apparatus installed in a vehicle and including: a camera configured to take images representing lateral sides and a rear side of the vehicle; and a display configured to display an image taken by the camera, as disclosed in Patent Document 1 (Japanese Patent Application Publication No. 2016-220011), Patent Document 2 (Japanese Patent Application Publication No. 2009-083613), Patent Document 3 (Japanese Patent Application Publication No. 2007-148618), and Patent Document 4 (Japanese Patent Application Publication No. 2009-040113).

SUMMARY

An image display apparatus is normally configured such that a camera and a display are active when an ignition switch is in an ON state, and the camera and the display are not active when the ignition switch is in an OFF state. In this image display apparatus, the display is not active when an occupant gets out of the vehicle after stopping the vehicle and changing the ignition switch into the OFF state. Thus, when getting out of the vehicle, the occupant cannot view the image representing the lateral sides and the rear side of the vehicle, leading to difficulty in checking the lateral sides and the rear side of the vehicle.

Accordingly, an aspect of the disclosure relates to an image display apparatus configured to display a taken image on a display before an occupant gets out of a vehicle.

In one aspect of the disclosure, an image display apparatus, comprises: a plurality of cameras each configured to take an image representing a view outside a vehicle; a plurality of displays each configured to display the image taken by a corresponding one of the plurality of cameras; and a controller configured to control the plurality of cameras and the plurality of displays, wherein the controller is configured to: detect a first action that is a preliminary action taken by an occupant of the vehicle to get out of the vehicle in a state in which the plurality of cameras and the plurality of displays are not activated; and when the first action is detected, activate at least one of the plurality of cameras and at least one of the plurality of displays and control the at least one of the plurality of displays to display an image taken by the at least one of the plurality of cameras.

EFFECTS

It is possible to display a taken image on a display before an occupant gets out of a vehicle.

CLAIMABLE INVENTION

There will be described by way of examples forms of inventions recognized to be claimable by the present appli- cant. The inventions may be hereinafter referred to as "claimable inventions" and include at least the invention as defined in the appended claims. However, the inventions may further include an invention of a concept subordinate or superordinate to the concept of the invention defined in the appended claims, and/or an invention of a concept different from the concept of the invention defined in the appended claims. The forms are numbered like the appended claims and depend from another form or forms, where appropriate, for easy understanding of the invention. It is to be understood that combinations of features of the claimable inventions are not limited to those of the following forms. That is, the claimable inventions are to be construed by taking account of, e.g., the description following each form, the description of the embodiments, and conventional techniques, and as long as the claimable inventions are constructed in this way, any one of the following forms may be implemented with one or more features added, or one or more of a plurality of features included in any one of the following forms are not necessarily provided all together.

(1) An image display apparatus, comprising:
a plurality of cameras each configured to take an image representing a view outside a vehicle;
a plurality of displays each configured to display the image taken by a corresponding one of the plurality of cameras; and
a controller configured to control the plurality of cameras and the plurality of displays,
wherein the controller is configured to:
detect a first action that is a preliminary action taken by an occupant of the vehicle to get out of the vehicle in a state in which the plurality of cameras and the plurality of displays are not activated; and
when the first action is detected, activate at least one of the plurality of cameras and at least one of the plurality of displays and control the at least one of the plurality of displays to display an image taken by the at least one of the plurality of cameras.

The preliminary action taken by the occupant of the vehicle to get out of the vehicle may be hereinafter referred to as "getting-out preliminary action". This getting-out preliminary action is taken after each of a plurality of the cameras and a plurality of the displays is changed to an OFF state by the occupant and before an action taken by the occupant getting out of the vehicle. For example, in the case where a sensor for detecting that the occupant is seated on a seat of the vehicle is provided, the sensor detects a change from a state in which the occupant is seated on the seat to a state in which the occupant is not seated on the seat, and when the state in which the occupant is not seated on the seat has continued for greater than or equal to a predetermined period, the getting-out action taken by the occupant getting out of the vehicle is detected. An action taken before this getting-out action (before the change to the state in which the occupant is not seated on the seat) is the getting-out preliminary action. Also, the getting-out preliminary action is taken in a state in which the vehicle is at rest and a state in which an engine or motors for driving the vehicle are not operated. Accordingly, the getting-out preliminary action is taken after an ignition switch is switched from its ON state to its OFF state and before the getting-out action taken by the occupant getting out of the vehicle is detected (before the change to the state in which the occupant is not seated on the seat), for example. Examples of the getting-out preliminary action include: an action taken by the occupant in advance of the getting-out action; and an action of equipment of the vehicle. The action taken by the occupant in advance of the getting-out action includes an operation performed by the occupant on the equipment of the vehicle. Examples of the operation include: an action of pressing a component for unfastening a seatbelt for getting out of the vehicle; and an action of pulling an inside handle for opening a door. Examples of the action of the equipment of the vehicle include: an action of, for getting out of the vehicle, changing a state of the seatbelt from a fastened state to an unfastened state; and an action of changing a state of the door from a closed state to an open state. In the present image display apparatus, when the first action as the getting-out preliminary action is detected, the controller activates at least one of the deactivated cameras and at least one of the deactivated displays. Thus, the image taken by the camera is displayed on the display before the occupant gets out of the vehicle. This configuration enables the occupant to check surroundings of the vehicle by viewing the image taken by the camera before getting out of the vehicle.

(2) The image display apparatus according to the above form (1), wherein the controller is configured to:

detect a second action of causing a change in a state of a door of the vehicle from a closed state to an open state as the first action in the state in which the plurality of cameras and the plurality of displays are not activated; and when the second action is detected, activate at least one of the plurality of cameras and at least one of the plurality of displays and control the at least one of the plurality of displays to display an image taken by the at least one of the plurality of cameras.

In the configuration described above, the controller detects that the door is changed from the closed state to the open state, by detecting the second action. Here, the closed state of the door refers to a state in which the door is completely closed. A state of the door in which the door is open from the closed state even a little (i.e., a door-ajar state) is an open state. Thus, the controller detects the state in which the door is open from the closed state even a little. When this state is detected, the controller activates at least one of the cameras and at least one of the displays and displays the taken image before the occupant gets out of the vehicle. This configuration enables the occupant to view the taken image before getting out of the vehicle.

(3) The image display apparatus according to the above form (1), wherein the controller is configured to:

detect a third action for opening a door of the vehicle as the first action in the state in which the plurality of cameras and the plurality of displays are not activated; and when the third action is detected, activate at least one of the plurality of cameras and at least one of the plurality of displays and control the at least one of the plurality of displays to display an image taken by the at least one of the plurality of cameras.

The third action for opening the door of the vehicle is an action taken when opening the door. Examples of the third action include: an action of unlocking the door; an action of touching the inside handle of the door; an action of pulling the inside handle of the door; and an action of pushing the door from the inside toward the outside of the vehicle. In the present image display apparatus, when having detected the action, the controller activates at least one of the cameras and at least one of the displays and displays the taken image. This configuration enables the occupant to view the taken image before getting out of the vehicle.

(4) The image display apparatus according to the above form (1), wherein the controller is configured to:

detect a fourth action taken by the occupant to move off a seat of the vehicle as the first action in the state in which the plurality of cameras and the plurality of displays are not activated; and when the fourth action is detected, activate at least one of the plurality of cameras and at least one of the plurality of displays and control the at least one of the plurality of displays to display an image taken by the at least one of the plurality of cameras.

The fourth action for the occupant to move off the seat is taken when the occupant moves off the seat. Examples of the fourth action include: an action of changing seating pressure applied from the occupant to the seat; an action of unlocking the seatbelt; and an action of changing the door to the open state. In the present image display apparatus, when the action is detected, the controller activates at least one of the cameras and at least one of the displays and displays the taken image. This configuration enables the occupant to view the taken image before getting out of the vehicle.

(5) The image display apparatus according to the above form (1), wherein the controller is configured to:

detect a first operation performed on equipment of the vehicle by the occupant to get out of the vehicle as the first action in the state in which the plurality of cameras and the plurality of displays are not activated; and when the first operation is detected, activate at least one of the plurality of cameras and at least one of the plurality of displays and control the at least one of the plurality of displays to display an image taken by the at least one of the plurality of cameras.

The first operation is performed for the equipment of the vehicle by the occupant to get out of the vehicle. It is noted that the equipment of the vehicle is a structure or a component installed on the vehicle. When the equipment is operated by the occupant, the structure and/or another or other structures are operated. The inside handle for opening the door of the vehicle is one example of the equipment of the vehicle. When the inside handle is operated, the door mechanically coupled to the inside handle is changed from the closed state to the open state, for example. A switch for detecting a pressing operation performed by the occupant is another example of the equipment of the vehicle. When the switch is operated, this operation is electrically detected. The controller based on this detection drives actuators such as motors to operate components or devices to be operated. Thus, the operation for the equipment of the vehicle by the occupant causes mechanical operations and/or electric operations of the components or devices to be operated. Examples of the first operation include: an operation of pushing a component for unlocking the door; an operation of pushing a component for unlocking the seatbelt; an operation of pulling the inside handle of the door; and an operation of pushing or pulling a switch (a component) for changing the door from the closed state to the open state. In the present image display apparatus, when the operation is detected, the controller activates at least one of the cameras and at least one of the displays and displays the taken image. This configuration enables the occupant to view the taken image before getting out of the vehicle.

(6) The image display apparatus according to the above form (3), wherein the controller is configured to:

detect a second operation performed on equipment of the vehicle by the occupant to open the door in the state in which the plurality of cameras and the plurality of displays are not activated; and when the second operation is detected, activate at least one of the plurality of cameras and at least one of the plurality of displays and control the at least one of the plurality of displays to display an image taken by the at least one of the plurality of cameras.

The second operation is performed by the occupant to open the door. Examples of the second operation include: the operation of pushing the component for unlocking the door; the operation of pulling the inside handle of the door; an operation of pushing a switch (a component) for changing the door from the closed state to the open state; and an operation of pushing the door from the inside toward the outside of the vehicle. In the present image display apparatus, when the operation is detected, the controller activates at least one of the cameras and at least one of the displays and displays the taken image. This configuration enables the occupant to view the taken image before getting out of the vehicle.

(7) The image display apparatus according to the above form (4), wherein the controller is configured to:

detect a third operation performed on equipment of the vehicle by the occupant to move off the seat in the state in which the plurality of cameras and the plurality of displays are not activated; and when the third operation is detected, activate at least one of the plurality of cameras and at least one of the plurality of displays and control the at least one of the plurality of displays to display an image taken by the at least one of the plurality of cameras.

The third operation is performed by the occupant to move off the seat. Examples of the third operation include: the operation of pushing the component for unlocking the seatbelt; the operation of pushing the component for unlocking the door; and an operation for opening the door. In the present image display apparatus, when the operation is detected, the controller activates at least one of the cameras and at least one of the displays and displays the taken image. This configuration enables the occupant to view the taken image before moving off the seat.

(8) The image display apparatus according to any one of the above forms (1) through (7), wherein the controller is configured to:

detect a touch of the occupant on an inside handle of a door of the vehicle in the state in which the plurality of cameras and the plurality of displays are not activated; and when the touch of the occupant on the inside handle is detected, activate at least one of the plurality of cameras and at least one of the plurality of displays and control the at least one of the plurality of displays to display an image taken by the at least one of the plurality of cameras.

The occupant touches the inside handle when the occupant is about to open the door or move off the seat. That is, the touch of the occupant on the inside handle is yet another example of the first action, the second action, the third action, the fourth action, the first operation, the second operation, and the third operation. Accordingly, in the present image display apparatus, by detecting a touch of the occupant on the inside handle, the controller can activate at least one of the cameras and at least one of the displays and display the taken image before the occupant gets out of the vehicle and before the door is changed to the open state.

(9) The image display apparatus according to any one of the above forms (1) through (7), wherein the controller is configured to:

detect a change in a state of a door of the vehicle from a locked state to an unlocked state in the state in which the plurality of cameras and the plurality of displays are not activated; and when the controller detects the change in the state of the door from the locked state to the unlocked state, activate at least one of the plurality of cameras and at least one of the plurality of displays and control the at least one of the plurality of displays to display an image taken by the at least one of the plurality of cameras.

The occupant unlocks the door when the occupant is about to open the door or move off the seat. That is, unlocking of the door is yet another example of the first action, the third action, the fourth action, the first operation, the second operation, and the third operation. Accordingly, in the present image display apparatus, by detecting unlocking of the door, the controller can activate at least one of the cameras and at least one of the displays and display the taken image before the occupant gets out of the vehicle and before the door is changed to the open state.

(10) The image display apparatus according to any one of the above forms (1) through (7), wherein the controller is configured to:

detect a change in a state of a seatbelt for a seat of the vehicle from a locked state to an unlocked state in the state in which the plurality of cameras and the plurality of displays are not activated; and when the controller detects the change in the state of the seatbelt from the locked state to the unlocked state, activate at least one of the plurality of cameras and at least one of the plurality of displays and control the at least one of the plurality of displays to display an image taken by the at least one of the plurality of cameras.

The occupant unlocks the seatbelt when the occupant is about to open the door or move off the seat. That is, unlocking of the seatbelt is yet another example of the first action, the third action, the fourth action, the first operation, the second operation, and the third operation. Accordingly, in the present image display apparatus, by detecting unlocking of the seatbelt, the controller can activate at least one of the cameras and at least one of the displays and display the taken image before the occupant gets out of the vehicle.

(11) The image display apparatus according to any one of the above forms (1) through (7), wherein the controller is configured to:

detect a change in seating pressure generated by the occupant seated on a seat of the vehicle in the state in which the plurality of cameras and the plurality of displays are not activated; and when the change in seating pressure generated by the occupant is detected, activate at least one of the plurality of cameras and at least one of the plurality of displays and control the at least one of the plurality of displays to display an image taken by the at least one of the plurality of cameras.

When the occupant is about to open the door or move off the seat, the occupant moves in a state in which the occupant is seated on the seat, so that the seating pressure generated by the occupant changes. That is, the change in seating pressure generated by the occupant seated on the seat is yet another example of the first action, the third action, the fourth action, the first operation, the second operation, and the third operation. Accordingly, in the present image display apparatus, by detecting the change in seating pressure generated by the occupant, the controller can activate at least one of the cameras and at least one of the displays and display the taken image before the occupant gets out of the vehicle.

(12) The image display apparatus according to the above form (1), wherein the controller is configured to, when the first action is detected:

activate (i) a first camera that is at least one of the plurality of cameras and (ii) a first display that is at least one of the plurality of displays which corresponds to the first camera; and control the first display to display an image taken by the first camera.

In the configuration described above, in the case where the first camera and the first display, for example, are installed at positions close to each other such as a driver-side side-mirror installed position and a driver's-seat-side instrument panel, the first display disposed near the driver's seat displays a taken image representing a view near the driver's seat. This configuration enables the occupant to check a surrounding of the driver's seat of the vehicle by viewing the first display in the same manner as a manner in which the occupant checks the surrounding of the driver's seat of the vehicle by viewing a conventional driver-side side mirror.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which.

DETAILED DESCRIPTION OF THE EMBODIMENTS

Hereinafter, there will be described embodiments by reference to the drawings.

Figure 1:
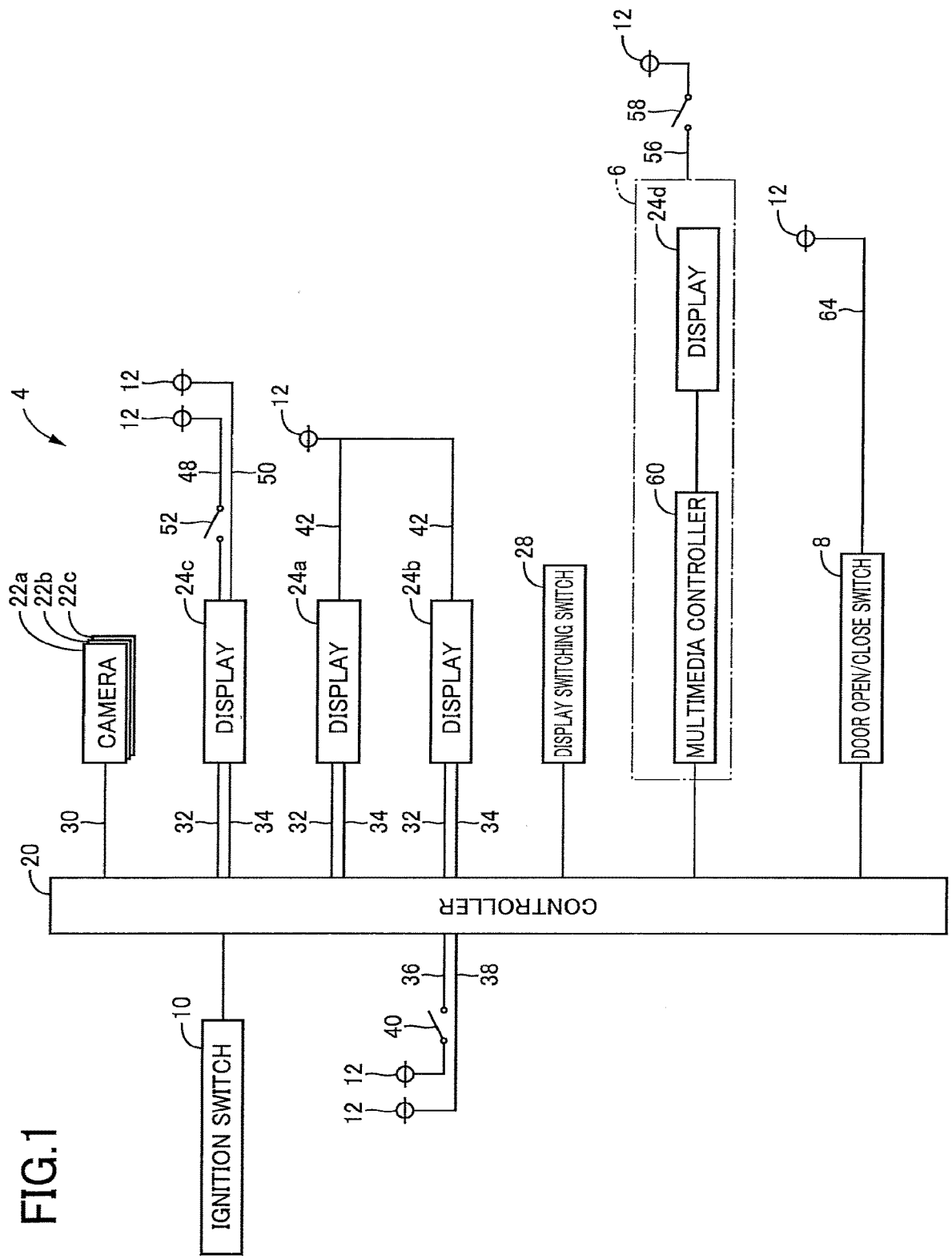
FIG. 1 is a schematic view of an overall configuration of an image display apparatus according to a first embodiment.
Figure 2:
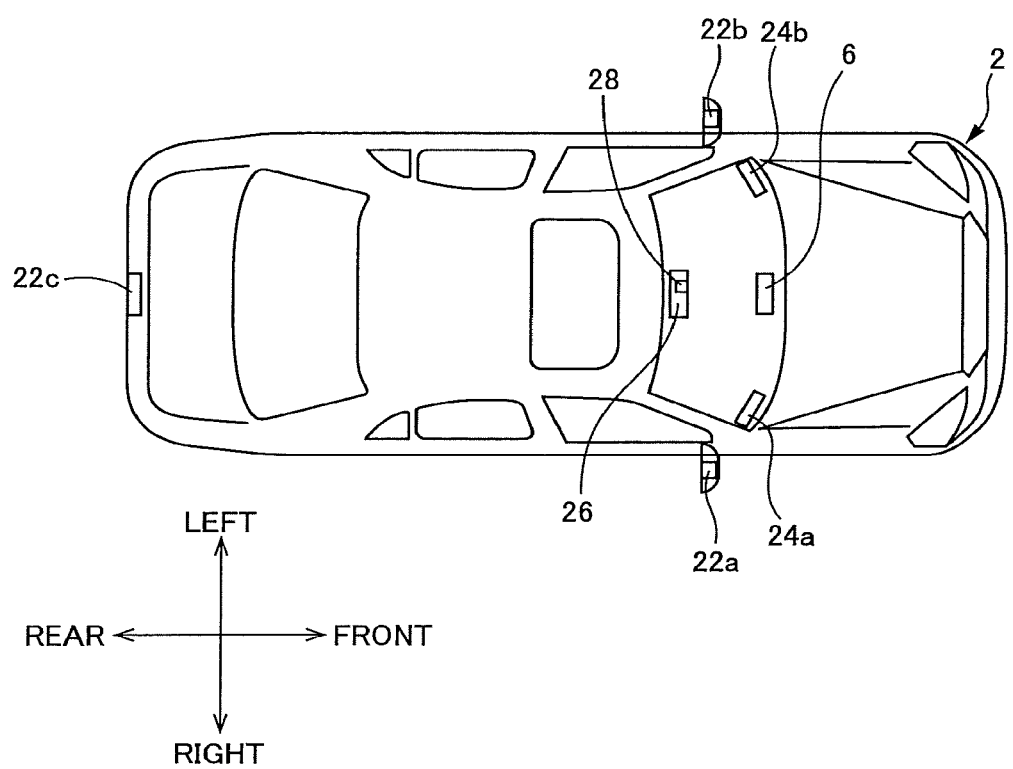
FIG. 2 is a view of a vehicle in the first embodiment which is viewed from above.
Figure 3:
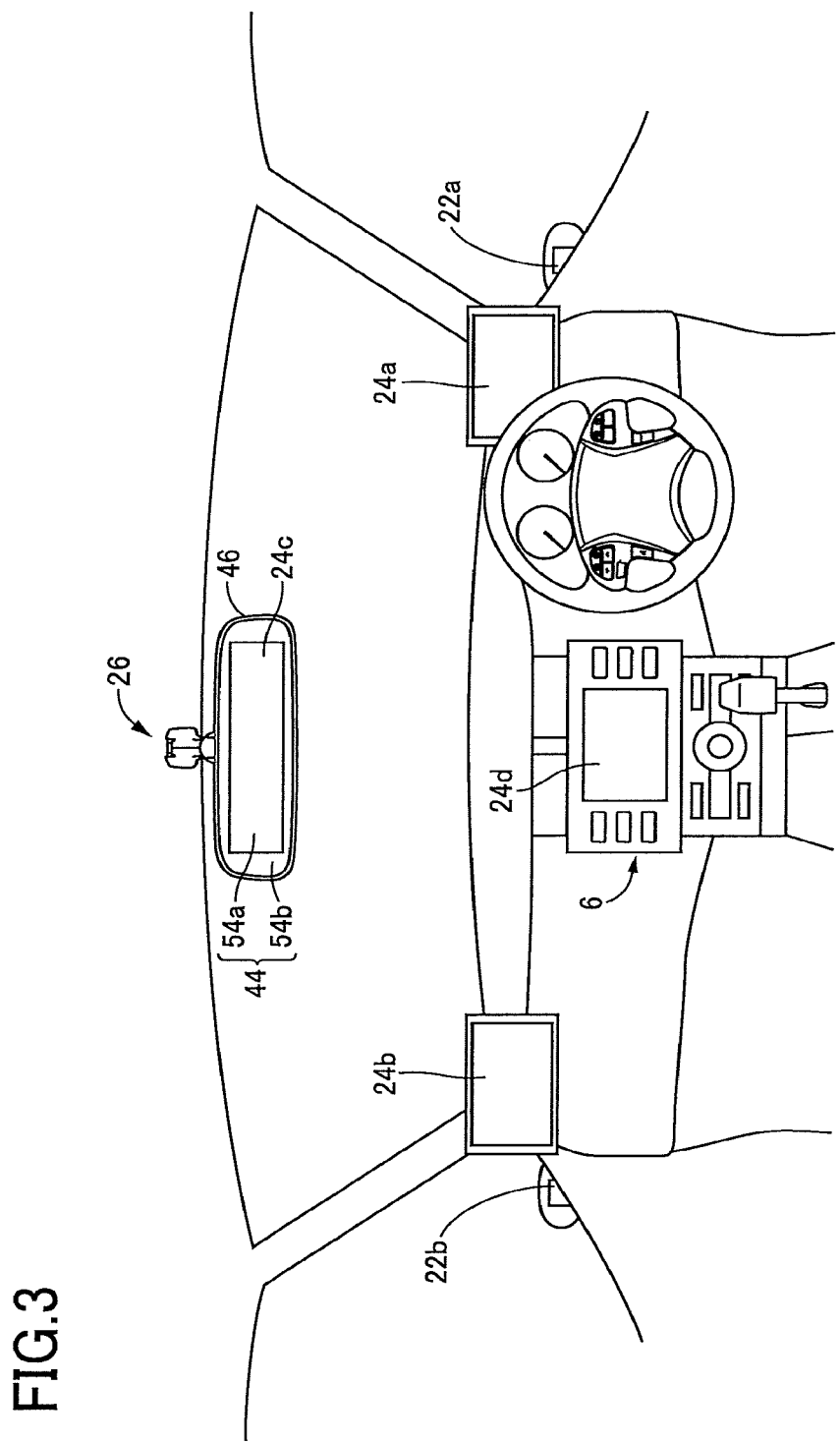
FIG. 3 is a view of the vehicle in the first embodiment which is viewed frontward from a passenger compartment.

FIG. 1 illustrates an overall configuration of an image display apparatus 4. FIG. 2 illustrates a vehicle 2 installed with the image display apparatus 4 according to a first embodiment when viewed from above. FIG. 3 illustrates the vehicle 2 when viewed frontward from a passenger compartment of the vehicle 2. As illustrated in FIG. 2, the direction of travel of the vehicle 2 is defined as a front and rear direction, and the widthwise direction of the vehicle 2 is defined as a right and left direction. As illustrated in FIG. 1, the vehicle 2 includes the image display apparatus 4, a multimedia monitor 6, door open/close switches 8, an ignition switch 10, and a battery 12. The image display apparatus 4 includes a controller 20, cameras 22a, 22b, 22c, displays 24a, 24b, a rear-view-image display device 26, and a display switching switch 28.

The controller 20 includes: non-volatile memories such as a CPU, a ROM, and an EEPROM; a RAM; various ICs; and a communication interface. The CPU executes programs stored in the ROM to execute various processings. Devices communicably connected to the controller 20 include the door open/close switches 8, the ignition switch 10, the cameras 22a, 22b, 22c, the displays 24a, 24b, a display 24c, the display switching switch 28, and a multimedia controller 60 which will be described below.

The controller 20 supplies electric power to the cameras 22a, 22b, 22c and obtains taken images from the cameras 22a, 22b, 22c via a plurality of camera connection lines 30. The controller 20 supplies electric power to the cameras 22a and/or 22b via the camera connection lines 30 when the ignition switch 10 is switched to an ON state or when an open state of one of doors of the vehicle 2 is detected based on a signal output from a corresponding one of the door open/close switches 8. When the ignition switch 10 is switched from the ON state to an OFF state, the electric power is stopped from being supplied to the cameras 22a, 22b. The controller 20 and each of the displays 24a, 24b, 24c are connected to each other by a corresponding one of ON/OFF control lines 32 and a corresponding one of image lines 34. Each of the ON/OFF control lines 32 is used when a signal for activating a corresponding one of the displays 24a, 24b, 24c (hereinafter may be referred to as "display activation signal") is output from the controller 20 to a controller, not illustrated, of the corresponding one of the displays 24a, 24b, 24c. Each of the image lines 34 is used when an image is output from the controller 20 to a corresponding one of the displays 24a, 24b, 24c. When the ignition switch 10 is switched to the ON state or when an open state of one of the doors is detected based on a signal output from a corresponding one of the door open/close switches 8, the controller 20 outputs the display activation signal to the controller of the display 24a and/or 24b. The controller of each of the displays 24a, 24b, 24c activates a corresponding one of the displays 24a, 24b, 24c when having received the display activation signal from the controller 20. When the ignition switch 10 is switched from the ON state to the OFF state or when one of the doors is switched from the open state to a closed state, a signal for deactivating the displays 24a, 24b and/or 24c (hereinafter may be referred to as display deactivation signal) is output from the controller 20.

The battery 12 is connected to the controller 20 via power supply lines 36, 38. A power-supply-line switch 40 is provided on a power supply line 36. When the ignition switch 10 is in the ON state, the power-supply-line switch 40 connects the controller 20 and the battery 12 to each other. When the ignition switch 10 is in the OFF state, the power-supply-line switch 40 interrupts the connection between the controller 20 and the battery 12. The power supply line 38 is what is called a permanent power supply line (+B line) which always connects the controller 20 and the battery 12 to each other. Electric power is always supplied to the controller 20 from the battery 12 via the power supply line 38. That is, the controller 20 is active even in the OFF state of the ignition switch 10.

As illustrated in FIG. 2, the cameras 22a, 22b are respectively installed at a right-side-mirror installed position and a left-side-mirror installed position of the vehicle 2 to take images respectively representing views on right and left sides of the vehicle 2. As illustrated in FIG. 2, the camera 22c is installed at a back door of the vehicle 2 to take an image representing a view behind the vehicle 2. Each of the cameras 22a, 22b, 22c uses an imaging device, such as a CCD (charge-coupled device) image sensor and a CMOS (complementary metal oxide semiconductor) image sensor, to take an image representing at least a visible-light area. Each of the cameras 22a, 22b, 22c is activated by electric power supplied from the controller 20 via the corresponding camera connection line 30, to take an image. The taken image is output to the controller 20 via the corresponding camera connection line 30. Each of the cameras 22a, 22b, 22c being activated stops taking images when the supply of the electric power from the controller 20 is stopped.

As illustrated in FIG. 3, the display 24a is mounted on an instrument panel disposed near a driver's seat. The display 24a displays an image taken by the camera 22a and representing a view located to the right of the vehicle 2. The display 24b is mounted on an instrument panel disposed near an assistant-driver's seat. The display 24b displays an image taken by the camera 22b and representing a view located to the left of the vehicle 2. As illustrated in FIG. 1, the controllers of the respective displays 24a, 24b are always connected to the battery 12 by respective power supply lines 42. Each of the controllers of the respective displays 24a, 24b activates a corresponding one of the displays 24a, 24b based on a signal received from the controller 20. That is, each of the displays 24a, 24b is activated regardless of the state of the ignition switch 10 by input of the display activation signal to the controller of the display from the controller 20 via the corresponding ON/OFF control line 32. While being activated, each of the displays 24a, 24b displays the image output from the controller 20 via the corresponding image line 34. Each of the displays 24a, 24b being activated stops displaying the image when the display deactivation signal is output from the controller 20.

The rear-view-image display device 26 is mounted on a ceiling of the vehicle 2 in the passenger compartment. The rear-view-image display device 26 is located in front of the driver's seat and between the driver's seat and the assistant-driver's seat. The rear-view-image display device 26 includes the display 24c, a mirror surface 44, and a frame 46. The display 24c is smaller in size than the mirror surface 44 and disposed at substantially the center of the mirror surface 44. The display 24c displays a rear-view image taken by the camera 22c. As illustrated in FIG. 1, the controller, not illustrated, of the display 24c is connected to the battery 12 via power supply lines 48, 50. A power-supply-line switch 52 is provided on the power supply line 48. When the ignition switch 10 is in the ON state, the power-supply-line switch 52 connects the display 24c and the battery 12 to each other. When the ignition switch 10 is in the OFF state, the power-supply-line switch 52 interrupts the connection between the display 24c and the battery 12. That is, when the ignition switch 10 is switched to the ON state, the battery 12 is connected to the display 24c via the power supply line 38, so that electric power is supplied to the display 24c. The power supply line 50 always connects the display 24c and the battery 12 to each other. Electric power is always supplied from the battery 12 to the controller of the display 24c via the power supply line 50. The controller of the display 24c activates the display 24c based on a signal output from the controller 20. That is, when the display activation signal is input from the controller 20 to the controller of the display 24c, the display 24c is activated regardless of the state of the ignition switch 10. The display 24c being activated stops displaying the image when the display deactivation signal is output from the controller.

As illustrated in FIG. 3, the mirror surface 44 is substantially the same as the frame 46 in size and fitted in the frame 46. The mirror surface 44 reflects a view behind the vehicle 2. The display 24c is formed at a portion of the mirror surface 44. That is, the mirror surface 44 includes: a mirror-surface portion 54a formed on a surface of the display 24c; and a mirror-surface portion 54b formed on a peripheral portion of the display 24c. When the display 24c is not activated, the mirror-surface portion 54a and the mirror-surface portion 54b serve as an optical mirror. This state may be hereinafter referred to as "mirror-surface showing state". When the display 24c is activated, an occupant of the vehicle 2 can visually recognize the image displayed on the display 24c. This state may be hereinafter referred to as "display showing state".

The display switching switch 28 is provided at a position at which the rear-view-image display device 26 and the ceiling of the vehicle 2 are connected to each other. The display switching switch 28 sends the controller 20 a signal for switching a display state of the rear-view-image display device 26 between the mirror-surface showing state and the display showing state. The display switching switch 28 is switched between an ON state and an OFF state when the angle of the frame 46 of the rear-view-image display device 26 is changed by the occupant. When operated by the occupant, the frame 46 is turned by a turning mechanism provided on the rear-view-image display device 26.

A holding mechanism is provided on the rear-view-image display device 26. When the frame 46 is held by the holding mechanism at an angle at which the mirror surface 44 reflects the ceiling of the vehicle 2, a contact of the display switching switch 28 is closed, so that the display switching switch 28 is switched to the ON state. When the display switching switch 28 is switched to the ON state, the display state of the rear-view-image display device 26 is switched to the display showing state. When the frame 46 is held by the holding mechanism at an angle at which the mirror surface 44 reflects a view behind the vehicle 2, the contact of the display switching switch 28 is opened, so that the display switching switch 28 is switched to the OFF state. When the display switching switch 28 is switched to the OFF state, the display state of the rear-view-image display device 26 is switched from the display showing state to the mirror-surface showing state.

The multimedia monitor 6 has functions such as Internet communication, a DVD player, a navigation system, and television. The multimedia monitor 6 is connected to the battery 12 via a power supply line 56. A power-supply-line switch 58 is provided on the power supply line 56. In the ON state of the ignition switch 10, the power-supply-line switch 58 connects the multimedia monitor 6 and the battery 12 to each other. In the OFF state of the ignition switch 10, the power-supply-line switch 58 interrupts the connection between the multimedia monitor 6 and the battery 12. Thus, in the ON state of the ignition switch 10, electric power is supplied from the battery 12 to the multimedia monitor 6 via the power supply line 56 to activate the multimedia monitor 6. In the OFF state of the ignition switch 10, the supply of the electric power from the battery 12 to the multimedia monitor 6 is stopped.

The multimedia monitor 6 includes the multimedia controller 60 and a display 24d. The controller 20 and the display 24d are communicably connected to the multimedia controller 60. In the ON state of the ignition switch 10, the multimedia controller 60 displays images or videos on the display 24d. The display 24d is capable of displaying not only a video of television and images relating to the navigation system but also images taken by the cameras 22a, 22b, 22c.

The door open/close switches 8 are provided at a right front door, a left front door, a right rear door, a left rear door, and the back door of the vehicle 2, respectively. Each of the door open/close switches 8 includes a pressing member and a switch casing. The door open/close switches 8 are provided at a peripheral portion of the vehicle 2 which defines openings of the vehicle 2. The switch casing of each of the door open/close switches 8 is embedded in the vehicle 2 at the peripheral portion, and the pressing member is exposed from the vehicle 2 at the peripheral portion. Each of the door open/close switches 8 is always connected to the battery 12 via a power supply line 64. The door open/close switch 8 outputs an ON signal to the controller 20 when the pressing member is pressed into the switch casing. The pressing member is pressed into the switch casing by the door in a state in which the door of the vehicle 2 is completely closed. It is noted that this state may be hereinafter referred to as "closed state". The pressing member is not pressed in the switch casing when the door of the vehicle 2 is in an open state including a door-ajar state in which the door is open slightly from the closed state. Each of the door open/close switches 8 detects the open state and the closed state of a corresponding one of the doors of the vehicle 2. When the door is in the closed state, the door open/close switch 8 is in an ON state and outputs the ON signal to the controller 20. When the door is switched from the closed state to the open state, the door open/close switch 8 becomes an OFF state and stops outputting the ON signal to the controller 20.

When a button of the ignition switch 10 is pressed by the occupant, the ignition switch 10 is switched between the ON state and the OFF state. In the present embodiment, the ON state of the ignition switch 10 includes an ignition-switch ON state (an IG-ON state) and an accessory-switch ON state (an ACC-ON state).

When the ignition switch 10 is in the ON state, the power-supply-line switches 40, 52, 58 are closed to connect each of the controller 20, the display 24c, and the multimedia monitor 6 to the battery 12. In this state, when the ON state of the ignition switch 10 is detected, the controller 20 supplies electric power from the controller 20 to the cameras 22a, 22b, 22c. Also, when the ON state of the ignition switch 10 is detected, the controller 20 outputs the display activation signal to the displays 24a, 24b via the ON/OFF control lines 32. When the ignition switch 10 is switched to the OFF state, each of the power-supply-line switches 40, 52, 58 interrupts the connection between the battery 12 and a corresponding one of the controller 20, the display 24c, and the multimedia monitor 6. This operation stops the supply of the electric power from the controller 20 to the cameras 22a, 22b, 22c and stops the output of the display activation signal from the controller 20 to the displays 24a, 24b.

There will be next described a process (a taken-image display process) executed by the controller 20 to display taken images on the displays 24a, 24b in the ON state and the OFF state of the ignition switch 10. In the ON state of the ignition switch 10, electric power is supplied from the controller 20 to the cameras 22a, 22b via the respective camera connection lines 30, so that the cameras 22a, 22b take images. Also, the display activation signal is output from the controller 20 to the displays 24a, 24b via the respective ON/OFF control lines 32, and the taken images are output to the displays 24a, 24b via the respective image lines 34. The taken images are displayed on the displays 24a, 24b. This enables the occupant to check lateral sides of the vehicle 2 by viewing the displays 24a, 24b.

Just after the ignition switch 10 is switched from the ON state to the OFF state, the door is in the closed state. Thus, the controller 20 and the door open/close switch 8 are in an ON state (which indicates that the door is in the closed state). In the OFF state of the ignition switch 10, each of the cameras 22a, 22b is in the OFF state, since no electric power is supplied from the controller 20 to the cameras 22a, 22b via the camera connection lines 30. Though the displays 24a, 24b are connected to the battery 12, each of the displays 24a, 24b is in the OFF state because the display deactivation signal is output from the controller 20 when the ignition switch 10 is switched to the OFF state. That is, since no taken images are displayed on the displays 24a, 24b, the occupant cannot check lateral sides of the vehicle 2 by viewing the taken images.

In the OFF state of the ignition switch 10, the door open/close switch 8 stops outputting the ON signal when the door is changed from the closed state to the open state. Based on the stop of the output of the ON signal by the door open/close switch 8, the controller 20 activates the camera and the display corresponding to one of the plurality of doors which is determined to be in the open state. For example, when the controller 20 determines that the right front door is in the open state based on a stop of output of the ON signal by the door open/close switch 8 corresponding to the right front door, the controller 20 supplies electric power to the right camera 22a to control the right camera 22a to take an image representing a view on a right side of the vehicle 2. The controller 20 then outputs the display activation signal to the right display 24a to activate the right display 24a and sends the right display 24a the image taken by the camera 22a. This configuration enables the occupant to check lateral sides and a rear side of the vehicle 2 by viewing the taken image displayed on the display 24a before getting out of the vehicle 2. When the door is switched from the closed state to the open state, the occupant in the vehicle 2 is performing an action for getting out of the vehicle 2. An action of changing the door from the closed state to the open state is one example of a preliminary action for the occupant to get out of the vehicle 2.

Figure 4:
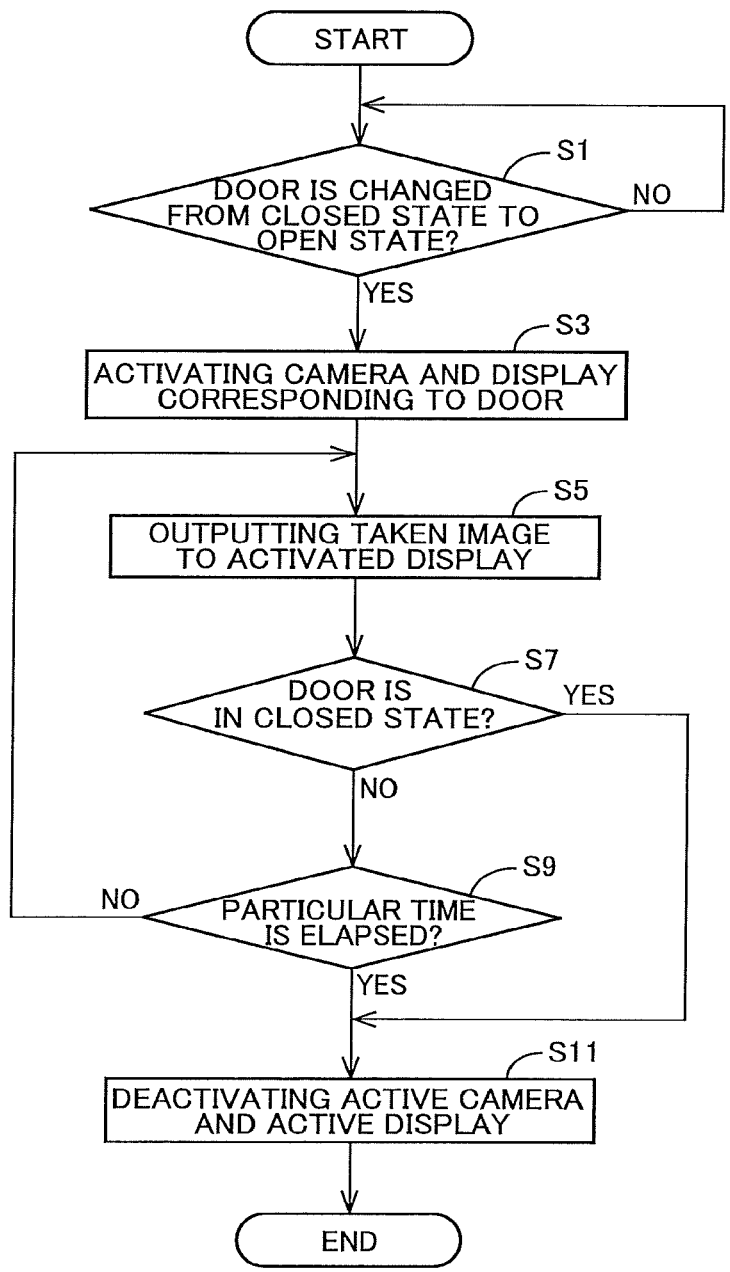
FIG. 4 is a flowchart of a process executed by a controller in the first embodiment.

There will be next described the taken-image display process in the OFF state of the ignition switch 10 with reference to the flowchart in FIG. 4. FIG. 4 illustrates the taken-image display process that begins when the ignition switch 10 is switched from the ON state to the OFF state, and each of the door open/close switches 8 corresponding to the right front door and the left front door is in the closed state. At S1, the controller 20 determines whether one of the doors is changed from the closed state to the open state, based on signals output from the respective door open/close switches 8 provided for the right front door and the left front door. When the controller 20 determines that the door is changed to the open state, this flow goes to S3. When the controller 20 determines that the door is not changed from the closed state to the open state, the controller 20 repeats the processing at S1. The controller 20 at S3 supplies electric power to the camera corresponding to the door determined to be changed from the closed state to the open state, to control the camera to take images. Also, the controller 20 outputs the ON signal to the display corresponding to the door determined to be changed from the closed state to the open state, to activate the display. The controller 20 at S5 sends the activated display the image taken by the active camera.

The controller 20 at S7 determines, based on the signals output from the door open/close switch 8, whether the door determined at S1 to be changed from the closed state to the open state is changed from the open state to the closed state. When the controller 20 determines that the door is not changed from the open state to the closed state, this flow goes to S9. When the controller 20 determines that the door is changed from the open state to the closed state, this flow goes to S11. The controller 20 at S9 determines whether the particular length of time is elapsed from a time when the taken images are displayed on the displays 24a, 24b. When the controller 20 determines that the particular length of time is not elapsed, this flow returns to S5. When the controller 20 determines that the particular length of time is elapsed, this flow goes to S11. The controller 20 at S11 stops supplying the electric power to the active camera and outputs the display deactivation signal to the active display, and this flow ends.

In the present embodiment as described above, the controller 20 determines whether the door is changed from the closed state to the open state, based on the ON signals output from the door open/close switches 8 provided for the right front door and the left front door of the vehicle 2. When the controller 20 determines that the door is changed from the closed state to the open state, the controller 20 activates the camera and the display corresponding to the door determined to be changed from the closed state to the open state. For example, when the right front door is opened by the occupant, the controller 20 determines that the right front door is switched from the closed state to the open state, based on the stop of output of the ON signal by the door open/close switch 8 provided for the right front door. When the right front door is changed from the closed state to the open state, the right display 24a displays an image taken by the right camera 22a and representing a view on a right side of the vehicle. This configuration enables the occupant to check a right-side situation by viewing the taken image before getting out of the vehicle 2 from the right front door to a right side of the vehicle 2.

Second Embodiment

There will be next described a second embodiment. In the first embodiment, the controller 20 detects the open state of the right front door or the left front door and activates the camera and the display corresponding to the door changed from the closed state to the open state. In the present second embodiment, when one of the right front door, the left front door, the right rear door, and the left rear door is changed to the open state, the controller 20 activates (i) all the cameras for taking images representing surroundings of the vehicle 2 and (ii) all the displays for displaying the taken images representing the surroundings of the vehicle 2. The configuration of the vehicle 2 in the second embodiment is similar to that of the vehicle 2 in the first embodiment, and an explanation thereof corresponding to FIGS. 1-3 will be dispensed with.

There will be next described the taken-image display process executed by the controller 20 to display taken images on the displays 24a, 24b, 24c, 24d in the ON state and the OFF state of the ignition switch 10. In the ON state of the ignition switch 10, electric power is supplied from the controller 20 to the cameras 22a, 22b, 22c via the respective camera connection lines 30, so that the cameras 22a, 22b, 22c take images. Also, the display activation signal is output from the controller 20 to the displays 24a, 24b, 24c via the respective ON/OFF control lines 32, and the taken images are output to the displays 24a, 24b, 24c via the respective image lines 34. The taken images are displayed on the displays 24a, 24b. This enables the occupant to check lateral sides of the vehicle 2 by viewing the displays 24a, 24b, 24c.

Just after the ignition switch 10 is switched from the ON state to the OFF state, each of the right front door, the left front door, the right rear door, and the left rear door is in the closed state. The controller 20 and the door open/close switches 8 are in an ON state (which indicates that each of the doors is in the closed state). In the OFF state of the ignition switch 10, each of the cameras 22a, 22b, 22c is in the OFF state since no electric power is supplied from the controller 20 to the cameras 22a, 22b, 22c via the camera connection lines 30. Though the displays 24a, 24b, 24c are connected to the battery 12, each of the displays 24a, 24b, 24c is in the OFF state because the display deactivation signal is output from the controller 20 when the ignition switch 10 is switched to the OFF state. That is, since no taken images are displayed on the displays 24a, 24b, 24c, the occupant cannot check lateral sides of the vehicle 2 by viewing the taken images.

In the OFF state of the ignition switch 10, the door open/close switch 8 stops outputting the ON signal when any of the doors is changed from the closed state to the open state. When the controller 20 determines, based on the stop of the output of the ON signal by the door open/close switch 8, that one of the four doors is changed from the closed state to the open state, the controller 20 activates (i) all the cameras for taking images representing surroundings of the vehicle 2 and (ii) all the displays for displaying the taken images representing the surroundings of the vehicle 2. In the case where one of the four doors is changed from the closed state to the open state, there is a possibility that another door is to be also changed to the open state. In the present embodiment, since all the cameras 22a, 22b, 22c and all the displays 24a, 24b, 24c, 24d are activated at the time when one of the four doors is changed from the closed state to the open state, the taken image can be viewed also by an occupant who is about to get out of the vehicle 2 from another door having not changed to the open state yet.

Each of the displays 24a, 24b, 24c may display a corresponding one of the images taken by the respective cameras 22a, 22b, 22c and may display two or three of the images taken by the respective cameras 22a, 22b, 22c at a time. Also, the display 24d may display at least one of the images taken by the respective cameras 22a, 22b, 22c. When the door is switched from the closed state to the open state, the occupant in the vehicle 2 is performing an action for getting out of the vehicle 2. An action of changing the door from the closed state to the open state is one example of the preliminary action for the occupant to get out of the vehicle 2.

Figure 5:
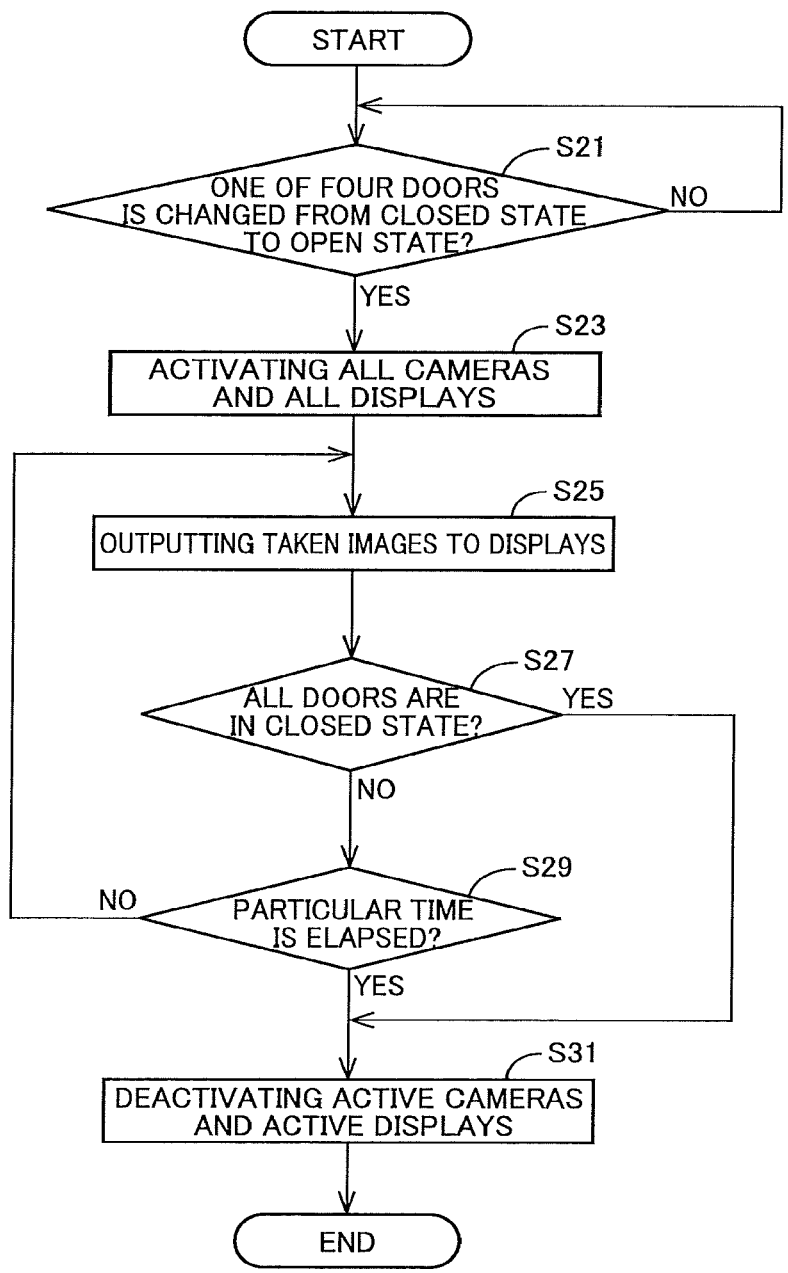
FIG. 5 is a flowchart of a process executed by a controller in a second embodiment.

FIG. 5 is a flowchart of the taken-image display process that begins when the ignition switch 10 is switched from the ON state to the OFF state, and each of the four door open/close switches 8 is in the closed state. At S21, the controller 20 determines whether one of the four doors is changed from the closed state to the open state, based on signals output from the door open/close switches 8 respectively provided for the right front door, the left front door, the right rear door, and the left rear door. When the controller 20 determines that one of the four doors is changed from the closed state to the open state, this flow goes to S23. When the controller 20 determines that none of the four doors is changed from the closed state to the open state, the controller 20 repeats the processing at S21. The controller 20 at S23 supplies electric power to the cameras 22a, 22b, 22c to control the cameras 22a, 22b, 22c to take images. Also, the controller 20 outputs the display activation signal to the displays 24a, 24b, 24c, 24d to activate the displays 24a, 24b, 24c, 24d. The controller 20 at S25 sends the displays 24a, 24b, 24c, 24d the images taken by the cameras 22a, 22b, 22c.

At S27, the controller 20 determines whether each of all the four doors is in the closed state, based on the signals output from the door open/close switches 8. When the controller 20 determines that at least one of the four doors is not in the closed state, this flow goes to S29. When the controller 20 determines that each of all the four doors is in the closed state, this flow goes to S31. At S29, the controller 20 determines whether a particular length of time is elapsed from a time when the taken images are displayed on the displays 24a, 24b, 24c, 24d. When the controller 20 determines that the particular length of time is not elapsed, this flow returns to S25. When the controller 20 determines that the particular length of time is elapsed, this flow goes to S31. At S31, the controller 20 stops supplying electric power to the cameras 22a, 22b, 22c and outputs the display deactivation signal to the displays 24a, 24b, 24c, 24d, and this flow ends.

In the present embodiment as described above, the controller 20 determines whether each of the four doors is changed from the closed state to the open state, based on the ON signals output from the door open/close switches 8 provided for the respective four doors of the vehicle 2. When the controller 20 determines that one of the four doors is changed from the closed state to the open state, the controller 20 activates the cameras 22a, 22b, 22c and the displays 24a, 24b, 24c. For example, in the case where both of occupants seated on the driver's seat and the assistant-driver's seat of the vehicle 2 are to get out of the vehicle 2, when the right front door is opened by the occupant seated on the driver's seat, the controller 20 determines that the right front door is switched from the closed state to the open state, based on the stop of output of the ON signal by the door open/close switch 8 provided for the right front door. When the right front door is changed from the closed state to the open state, not only the display 24a near the driver's seat but also the displays 24b, 24c display the taken images. With this configuration, not only the occupant having opened the right front door but also the occupant seated on the assistant-driver's seat and having not opened the left front door yet can check a situation outside the vehicle 2 by viewing the taken image.

Third Embodiment

Figure 6:
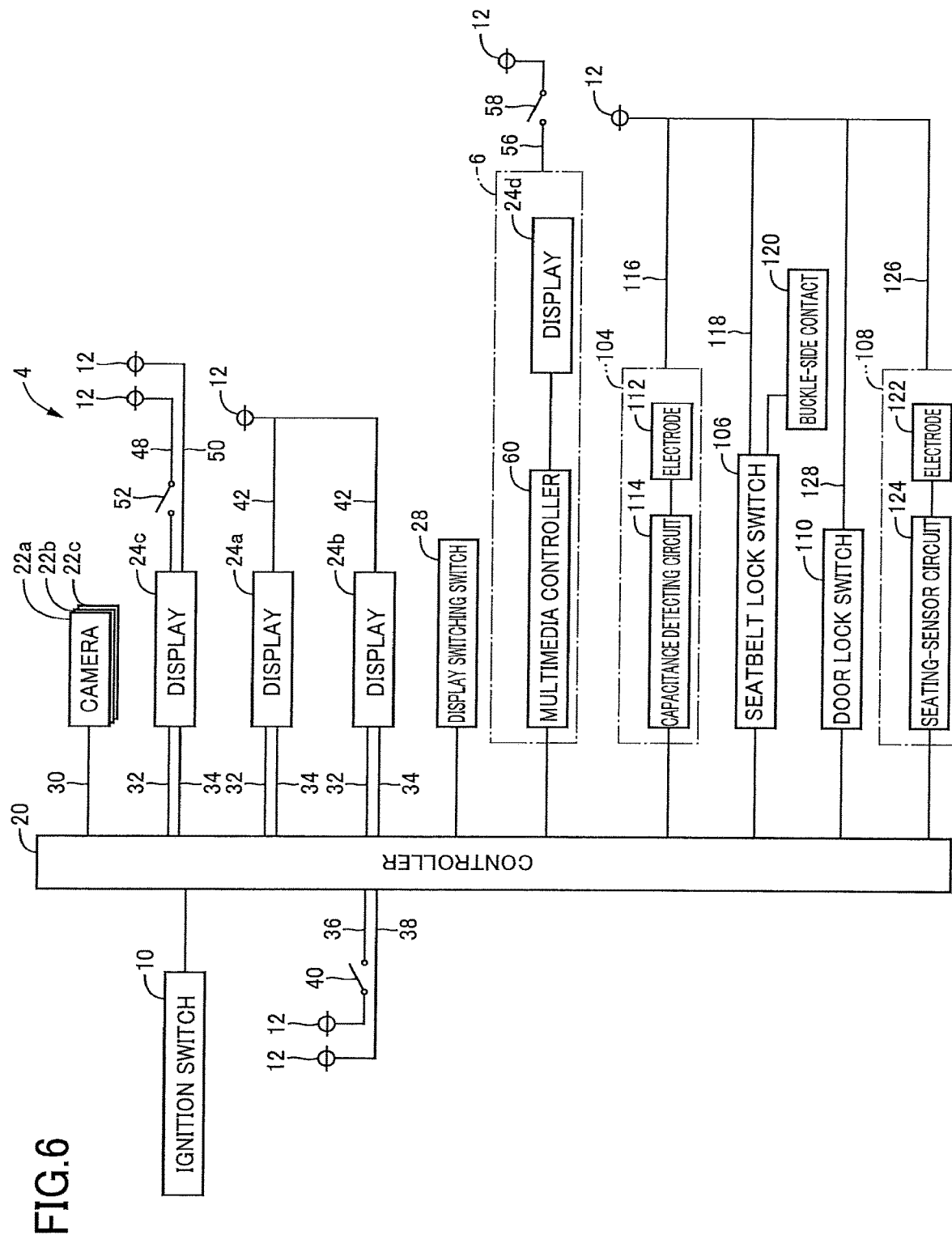
FIG. 6 is a schematic view of an overall configuration of an image display apparatus according to a third embodiment.

There will be next described a third embodiment. In the first embodiment, when the door of the vehicle 2 is changed from the closed state to the open state, the taken image is displayed on the display 24a or the display 24b. In the third embodiment, in contrast, the taken image is displayed on the display 24a or the display 24b before the door of the vehicle 2 becomes the open state. FIG. 6 illustrates a configuration of an image display apparatus 4 according to the third embodiment. In the third embodiment, as illustrated in FIG. 6, a vehicle 102 includes the image display apparatus 4, the multimedia monitor 6, the ignition switch 10, the battery 12, capacitance detectors 104, seatbelt lock switches 106, seating sensors 108, and door lock switches 110. The image display apparatus 4, the multimedia monitor 6, the ignition switch 10, the battery 12 illustrated in FIG. 1 and the configuration relating to FIGS. 2 and 3 are the same between the third embodiment and the first embodiment, and a detailed explanation of which is dispensed with.

The capacitance detectors 104 are respectively provided at inside handles of the right front door, the left front door, the right rear door, and the left rear door of the vehicle 2. Each of the capacitance detectors 104 detects a change in capacitance of electrodes 112 provided at a corresponding one of the inside handles. Each of the capacitance detectors 104 includes the electrodes 112 and a capacitance detecting circuit 114. As illustrated in FIG. 5, each of the capacitance detectors 104 is always connected to the battery 12 via a power supply line 116. Thus, electric power is always supplied from the battery 12 to the capacitance detectors 104, so that the capacitance detectors 104 are always active regardless of the state of the ignition switch 10. The electrodes 112 are two electric conductors in the form of two flat plates. When a voltage is applied to the electrodes 112, an electric charge accumulates on each of the electrodes 112. Capacitance is an amount of the electric charge accumulatable on the electrode 112. The capacitances of the respective two flat plates are coupled to each other (capacitive coupling), whereby the electric charge is transferred between the two flat plates. When a conductor such as a person's finger has approached the electrodes 112 in this state, the conductor functions as an electrode, and the capacitance of the conductor is coupled to the capacitance of the two flat plates, resulting in increase in capacitance of the two flat plates. Accordingly, the magnitude of the capacitance of the electrodes 112 is large when the occupant has touched the electrodes 112 (or when a hand of the occupant has approached the electrodes 112), and the magnitude of the capacitance of the electrodes 112 is returned to its original value when the hand of the occupant has moved off the electrodes 112. That is, it is possible to consider that each of the capacitance detectors 104 is a detector configured to detect whether the occupant has touched the inside handle. The capacitance detecting circuit 114 outputs a detection signal relating to the magnitude of the capacitance of the corresponding electrodes 112, to the controller 20 each time when a specific length of time is elapsed.

Each of the seatbelt lock switches 106 is embedded in a buckle of a seatbelt provided for a corresponding one of a right front seat, a left front seat, a right rear seat, and a left rear seat of the vehicle 102. Each of the seatbelt lock switches 106 detects whether the seatbelt is locked by insertion of a tongue of the seatbelt into the buckle. Each of the seatbelt lock switches 106 is always connected to the battery 12 via a power supply line 118. Thus, the seatbelt lock switches 106 are always active regardless of the state of the ignition switch 10. Each of the seatbelt lock switches 106 is connected to the controller 20 and a buckle-side contact 120 provided on the corresponding buckle. The buckle-side contact 120 outputs a signal to the corresponding seatbelt lock switch 106 upon contacting a tongue-side contact provided on the tongue when the tongue is inserted in the buckle. Upon receiving the signal from the buckle-side contact 120, the seatbelt lock switch 106 outputs a lock signal to the controller 20. When the tongue is pulled out of the buckle, and thereby the buckle-side contact 120 and the tongue-side contact become separated from each other, the buckle-side contact 120 stops outputting the signal, so that the seatbelt lock switch 106 stops outputting the lock signal.

The seating sensors 108 are respectively provided at the right front seat, the left front seat, the right rear seat, and the left rear seat of the vehicle 102. Each of the seating sensors 108 detects a change in capacitance of a plurality of electrodes 122 to detect an action being taken by the occupant seated on the seat. Each of the seating sensors 108 includes the electrodes 122 and a seating-sensor circuit 124. Each of the seating sensors 108 is always connected to the battery 12 via a power supply line 126. Thus, the seating sensors 108 are always active regardless of the state of the ignition switch 10. The electrodes 122 each having an elongated shape are arranged parallel with each other in the seat of the vehicle 2. Capacitance is generated between the electrodes 122 by application of a voltage to the electrodes 122. The magnitude of the capacitance of each of the electrodes 122 increases when a portion of a body of the occupant as a conductor has approached or touched the electrode 122. For example, the electrodes 122 are uniformly arranged over the entire sitting surface of the seat, and the seating sensor 108 is configured to detect a local change in seating pressure on the sitting surface of the seat. That is, when the occupant has performed an action in a state in which the occupant is seated on the seat, some of the electrodes 122 change in capacitance. The seating sensor 108 specifies the electrodes 122, of which capacitance has changed, among the plurality of electrodes 122 to detect a position on the sitting surface of the seat where the seating pressure has changed. The electrodes 122 and the controller 20 are connected to the seating-sensor circuit 124. The seating-sensor circuit 124 outputs a signal relating to the magnitude of the capacitance of each of the electrodes 122, to the controller 20 each time when a specific length of time is elapsed.

The door lock switches 110 are respectively provided at the right front door, the left front door, the right rear door, and the left rear door of the vehicle 2. Each of the door lock switches 110 is provided on a latch mechanism which includes: a latch provided on the corresponding door of the vehicle 2 and a striker provided on a vehicle body. When the door is changed to the closed state and thereby the striker is pushed into the latch, the striker and the latch are engaged with each other to lock the door. When unlocking the door, an actuator disengages the striker and the latch from each other. Each of the door lock switches 110 detects a locked state and an unlocked state of the latch mechanism. The door lock switch 110 is connected to the controller 20 and the battery 12. The door lock switch 110 outputs an ON signal to the controller 20 when the latch mechanism is in the unlocked state. The door lock switch 110 stops outputting the ON signal when the latch mechanism is in the locked state. Each of the door lock switches 110 is always connected to the battery 12 via a power supply line 128. Thus, the door lock switches 110 are always active regardless of the state of the ignition switch 10.

There will be next described the taken-image display process executed by the controller 20 in the ON state and the OFF state of the ignition switch 10. In the ON state of the ignition switch 10, electric power is supplied from the controller 20 to the cameras 22a, 22b via the respective camera connection lines 30, so that the cameras 22a, 22b take images. Also, the display activation signal is output from the controller 20 to the displays 24a, 24b via the respective ON/OFF control lines 32, and the taken images are output to the displays 24a, 24b via the respective image lines 34. The taken images are displayed on the displays 24a, 24b. This enables the occupant to check lateral sides of the vehicle 2 by viewing the displays 24a, 24b.

Just after the ignition switch 10 is switched from the ON state to the OFF state, each of the cameras 22a, 22b is in the OFF state, since no electric power is supplied from the controller 20 to the cameras 22a, 22b via the camera connection lines 30. Though the displays 24a, 24b are connected to the battery 12, each of the displays 24a, 24b is in the OFF state because the display deactivation signal is output from the controller 20 when the ignition switch 10 is switched to the OFF state. That is, since no taken images are displayed on the displays 24a, 24b, the occupant cannot check lateral sides of the vehicle 2 by viewing the taken images.

In the OFF state of the ignition switch 10, when one of the first to fourth conditions described below is satisfied in a state in which none of the first to fourth conditions is satisfied, the controller 20 activates the cameras 22a, 22b and the displays 24a, 24b and displays the taken images on the displays 24a, 24b. The first condition is that the occupant has touched the inside handle. The capacitance detecting circuit 114 outputs the signal relating to the capacitance of the corresponding electrodes 112, to the controller 20 each time when the specific length of time is elapsed. The controller 20 determines, based on the signal output from the capacitance detecting circuit 114 provided for each of the right front door and the left front door, whether the magnitude of the capacitance of the electrodes 112 is greater than or equal to a threshold value. Here, the threshold value of the capacitance is a value for determination, using the magnitude of the capacitance, of whether the inside handle is touched by the occupant. When the magnitude of the capacitance is greater than or equal to the threshold value, the controller 20 determines that the occupant is touching the inside handle. When the magnitude of the capacitance is less than the threshold value, the controller 20 determines that the occupant is not touching the inside handle. Each of an action of causing decrease in the capacitance of the electrodes 112 of the capacitance detector 104 and an action taken by the occupant touching the inside handle is one example of a preliminary action taken by the occupant for getting out of the vehicle 102.

The second condition is that the seatbelt has been unlocked. Each of the seatbelt lock switches 106 outputs the lock signal when the seatbelt is locked, with the tongue inserted in the buckle. The seatbelt lock switch 106 stops outputting the lock signal when the seatbelt is unlocked by pulling of the tongue out of the buckle. The controller 20 determines whether the seatbelt is unlocked, for each of the right front seat and the left front seat. Each of an action of unlocking the seatbelt and an operation of the occupant for unlocking the seatbelt is another example of the preliminary action taken by the occupant for getting out of the vehicle 102.

The third condition is that the seating pressure has decreased. When the occupant performs an action in the state in which the occupant is seated on the seat, a position of contact between the occupant and the seat changes. This positional change changes the magnitude of the capacitance of each of the electrodes 122 provided in the seat. An action taken by the occupant is detected based on a change in the magnitude of the capacitance of each of the electrodes 122. In the OFF state of the ignition switch 10, the controller 20 detects whether the seating pressure has decreased, by detecting whether the magnitude of the capacitance of the electrodes 122 of each of the seating sensors 108 provided for the right front seat and the left front seat has changed by an amount greater than or equal to a particular value. Each of an action of causing decrease in capacitance of the electrodes 122 of each of the seating sensors 108 and an action taken by the occupant decreasing the seating pressure is yet another example of the preliminary action taken by the occupant for getting out of the vehicle 102.

The fourth condition is that the door is changed to its unlocked state. When the ON signal is output from the door lock switch 110, the door is in the unlocked state in which the door is openable. The controller 20 determines whether each of the right front door and the left front door is changed to an unlocked state. When the door is changed to the unlocked state, the occupant is about to open the door and get out of the vehicle 2. Each of an action of changing the door from the locked state to the unlocked state and an action taken by the occupant changing the door to the unlocked state is yet another example of the preliminary action taken by the occupant for getting out of the vehicle 102.

Figure 7:
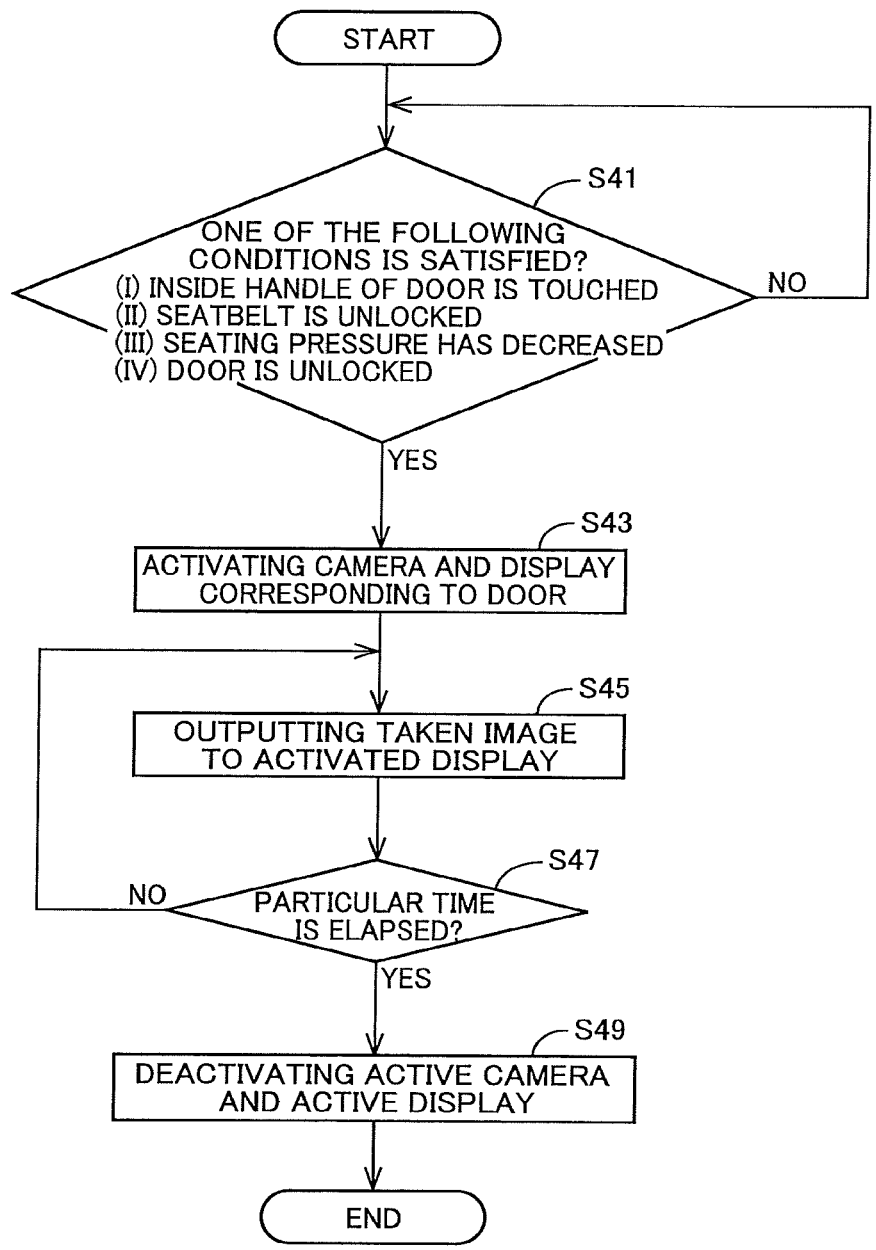
FIG. 7 is a flowchart of a process executed by the controller in a third embodiment.

There will be next described the taken-image display process in the OFF state of the ignition switch 10 with reference to the flowchart in FIG. 7. FIG. 7 illustrates the taken-image display process that begins when the ignition switch 10 is switched from the ON state to the OFF state, and none of the first to fourth conditions is not satisfied. At S41, the controller 20 determines whether one of the first to fourth conditions is satisfied. When the controller 20 determines that one of the first to fourth conditions is satisfied, that is, when the controller 20 determines that the occupant has performed the preliminary action of getting out of the vehicle 102, this flow goes to S43. When the controller 20 determines that none of the first to fourth conditions is satisfied, that is, when the controller 20 determines that the occupant has not performed the preliminary action of getting out of the vehicle 102, the controller 20 executes the processing at S41.

At S43, the controller 20 determines whether the condition satisfied among the first to fourth conditions is satisfied on a driver's-seat side or an assistant-driver's-seat side. The controller 20 supplies electric power to the camera corresponding to a position for which the condition is satisfied, and outputs the display activation signal to the display corresponding to the camera. For example, regarding the first condition, when the inside handle of the right front door is touched by the occupant, the controller 20 activates the right camera 22a and the right display 24a, and when the inside handle of the left front door is touched by the occupant, the controller 20 activates the left camera 22b and the left display 24b. Regarding the second condition, when the seatbelt at the driver's seat is changed to its unlocked state by the occupant, the controller 20 activates the right camera 22a and the right display 24a, and when the seatbelt at the assistant-driver's seat is changed to the unlocked state by the occupant, the controller 20 activates the left camera 22b and the left display 24b. Regarding the third condition, when the seating pressure generated by the occupant seated on the driver's seat has decreased, the controller 20 activates the right camera 22a and the right display 24a, and when the seating pressure generated by the occupant seated on the assistant-driver's seat has decreased, the controller 20 activates the left camera 22b and the left display 24b. Regarding the fourth condition, when the right front door is changed to the unlocked state by the occupant, the controller 20 activates the right camera 22a and the right display 24a, and when the left front door is changed to the unlocked state by the occupant, the controller 20 activates the left camera 22b and the left display 24b.

At S45, the controller 20 sends the activated display the image taken by the activated camera. The controller 20 at S47 determines whether a particular length of time is elapsed from a time when the taken image is displayed on the active display. When the controller 20 determines that the particular length of time is not elapsed, this flow returns to S45. When the controller 20 determines that the particular length of time is elapsed, this flow goes to S49. At S49, the controller 20 stops supplying the electric power to the active camera and outputs the display deactivation signal to the active display, and this flow ends.

In the present embodiment as described above, the controller 20 determines whether the occupant is performing the preliminary action of getting out of the vehicle 102, based on whether one of the first to fourth conditions is satisfied. When the first condition is satisfied, the controller 20 detects that the occupant is touching the inside handle of the door. When the second condition is satisfied, the controller 20 detects that the seatbelt is changed to the unlocked state. When the third condition is satisfied, the controller 20 detects that the seating pressure generated by the occupant has decreased. When the fourth condition is satisfied, the controller 20 detects that the door is changed to the unlocked state. Each of these detected actions is one example of a preliminary action taken by the occupant for getting out of the vehicle 102. When one of the first to fourth conditions is satisfied, the occupant is about to get out of the vehicle 102. The controller 20 at this time displays the taken image on the display corresponding to a position at which the occupant is seated, whereby before opening the door of the vehicle 102, the occupant can view the taken image representing a view on a side of the vehicle 102 to which the occupant is about to get out.

In the present embodiment, the controller 20 is one example of a controller, and the OFF state of the ignition switch 10 is one example of a state in which the cameras and the displays are not active. A stop of output of the ON signal from the door open/close switch 8 is one example of a first action and a second action. A change in the magnitude of the capacitance detected the capacitance detector 104 to a value greater than the threshold value (i.e., a touch of the occupant on the inside handle) is another example of the first action and the second action and one example of a third action, a fourth action, a first operation, a second operation, and a third operation. A stop of output of the lock signal from the seatbelt lock switch 106 (i.e., unlocking of the seatbelt by the occupant) is yet another example of the first action and another example of the third action, the fourth action, the first operation, the second operation, and the third operation. A change in the magnitude of the capacitance of the electrodes 122 of the seating sensor 108 (i.e., movement of the occupant seated on the seat) is yet another example of the first action, the third action, and the fourth action. An output of the ON signal by the door lock switch 110 (i.e., unlocking of the door by the occupant) is yet another example of the first action, the third action, the fourth action, the first operation, the second operation, and the third operation.

While the embodiments have been described above, it is to be understood that the disclosure is not limited to the details of the illustrated embodiments, but may be embodied with various changes and modifications, which may occur to those skilled in the art, without departing from the spirit and scope of the disclosure. While the controller 20 executes the taken-image display process when one of the first to fourth conditions is satisfied in the third embodiment, the present disclosure is not limited to this configuration. For example, one of the first to fourth conditions may be employed as a condition for execution of the processing at S41 in the taken-image display process. In this case, the controller 20 may execute the taken-image display process when the condition is satisfied, and may not execute the taken-image display process when the condition is not satisfied. While the displays 24a, 24b, 24c display the images taken by the cameras 22a, 22b mounted at the side-mirror installed position and the image taken by the camera 22c mounted on the back door, the present disclosure is not limited to this configuration. The camera only needs to take an image representing a view near the vehicle 2 and only needs to take an image to be checked by the occupant when the occupant gets out of the vehicle 2. For example, the image display apparatus 4 may be configured such that the cameras are mounted near the right rear door and the left rear door to take images representing views near the right rear door and the left rear door, and the taken images are displayed on the displays provided at the right rear seat and the left rear seat.

While the taken images are displayed on the displays 24a, 24b provided on the instrument panel and the display 24c provided on the rear-view-mirror installed position, the present disclosure is not limited to this configuration. The display only needs to be disposed at a position viewable by the occupant. For example, the display may be mounted at a position near the rear seat at which the display is viewable by the occupant seated on the rear seat. While the display 24c is formed on the mirror surface 44 of the rear-view-image display device 26, the present disclosure is not limited to this configuration. The display 24c may be formed as an element of the rear-view-image display device 26 not including the mirror surface.

While the right camera 22a and the right display 24a are activated when the right front door is changed from the closed state to the open state in the first embodiment, the present disclosure is not limited to this configuration. For example, the right camera 22a and the right display 24a may be activated when the door corresponding to the right rear seat is changed from the closed state to the open state. While all the cameras and all the displays are activated when one of the four doors is changed from the closed state to the open state in the second embodiment, the present disclosure is not limited to this configuration. For example, the image display apparatus 4 may be configured such that when the back door or a rear gate is changed from the closed state to the open state, the controller 20 activates (i) the camera 22c configured to take an image representing a view at a rear of the vehicle and (ii) the display 24c configured to display the taken image representing the rear-side view or activates at least two of the cameras and at least two of the displays. The at least two cameras may be all the cameras, and the at least two displays may be all the displays.

While the controller 20 activates the camera and the display corresponding to a satisfied one of the first to fourth conditions in the third embodiment, the present disclosure is not limited to this configuration. For example, when one of the four conditions is satisfied, the controller 20 may activate at least two of the cameras and at least two of the displays. The at least two cameras may be all the cameras, and the at least two displays may be all the displays.

What is claimed is:

1. An image display apparatus, comprising:
    a driver's-seat-side camera provided at a driver's seat side of a vehicle and configured to take an image representing a view outside the vehicle;
    as assistant-driver's-seat-side camera provided at an assistant-driver's seat side of the vehicle and configured to take an image representing a view outside the vehicle;
    a driver's-seat-side display provided at the driver's seat side of the vehicle and configured to display the image taken by the driver's-seat-side camera;
    an assistant-driver's-seat-side display provided at the assistant-driver's seat side of the vehicle and configured to display the image taken by the assistant-driver's-seat-side camera;
    a driver's-seat-side detector provided at the driver's seat side of the vehicle and configured to detect a preliminary action taken by an occupant of the vehicle to get out of the vehicle via a driver's-seat-side door of the vehicle;
    an assistant-driver's-seat-side detector provided at the assistant-driver's seat side of the vehicle and configured to detect a preliminary action taken by an occupant of the vehicle to get out of the vehicle via an assistant-driver's-seat-side door of the vehicle; and
    a controller configured to:
        detect, as a first action, the preliminary action detected by the driver's-seat-side detector or the preliminary action detected by the assistant-driver's-seat-side detector in a state in which the driver's-seat-side camera, the assistant-driver's-seat-side camera, the driver's-seat-side display, and the assistant-driver's-seat-side display are not activated; and
        when the first action is the preliminary action detected by the driver's-seat-side detector, activate the driver's-seat-side camera and the driver's-seat-side display, without activating the assistant-driver's-seat-side camera and the assistant-driver's-seat-side display, to display an image taken by the driver's-seat-side camera; and
        when the first action is the preliminary action detected by the assistant-driver's-seat-side detector, activate the assistant-driver's-seat-side camera and the assistant-driver's-seat-side display, without activating the driver's-seat-side camera and the driver's-seat-side display, to display an image taken by the assistant-driver's-seat-side camera.

2. The image display apparatus according to claim 1, wherein
    the driver's-seat-side detector is configured to detect a second action that is a change in a state of the driver's-seat-side door of the vehicle from a closed state to an open state;
    the assistant-driver's-seat-side detector is configured to detect a second action that is a change in a state of the assistant-driver's-seat-side door of the vehicle from a closed state to an open state; and
    the controller is configured to:
        detect, as the first action, the second action detected by the driver's-seat-side detector or the second action detected by the assistant-driver's-seat-side detector in the state in which the driver's-seat-side camera, the assistant-driver's-seat-side camera, the driver's-seat-side display, and the assistant-driver's-seat-side display are not activated;
        when the first action is the second action detected by the driver's-seat-side detector, activate the driver's-seat-side camera and the driver's-seat-side display, without activating the assistant-driver's-seat-side camera and the assistant-driver's-seat-side display, to display an image taken by the driver's-seat-side camera; and
        when first action is the second action detected by the assistant-driver's-seat-side detector, activate the assistant-driver's-seat-side camera and the assistant-driver's-seat-side display, without activating the driver's-seat-side camera and the driver's-seat-side display, to display an image taken by the assistant-driver's-seat-side camera.

3. The image display apparatus according to claim 1, wherein
    the driver's-seat-side detector is configured to detect a third action for opening the driver's-seat-side door of the vehicle;
    the assistant-driver's-seat-side detector is configured to detect a third action for opening the assistant-driver's-seat-side door of the vehicle; and
    the controller is configured to:
        detect, as the first action, the third action detected by the driver's-seat-side detector or the third action detected by the assistant-driver's-seat-side detector in the state in which the driver's-seat-side camera, the assistant-driver's-seat-side camera, the driver's-seat-side display, and the assistant-driver's-seat-side display are not activated;

when the first action is the third action detected by the driver's-seat-side detector, activate the driver's-seat-side camera and the driver's-seat-side display, without activating the assistant-driver's-seat-side camera and the assistant-driver's-seat-side display, to display an image taken by the driver's-seat-side camera; and when the first action is the third action detected by the assistant-driver's-seat-side detector, activate the assistant-driver's-seat-side camera and the assistant-driver's-seat-side display, without activating the driver's-seat-side camera and the driver's-seat-side display, to display an image taken by the assistant-driver's-seat-side camera.

4. The image display apparatus according to claim 1, wherein
the driver's-seat-side detector is configured to detect a fourth action taken by the occupant to move off a driver's-seat-side seat of the vehicle;
the assistant-driver's-seat-side detector is configured to detect a fourth action taken by the occupant to move off an assistant-driver's-seat-side seat of the vehicle; and
the controller is configured to:
detect, as the first action, the fourth action detected by the driver's-seat-side detector or the fourth action detected by the assistant-driver's-seat-side detector in the state in which the driver's-seat-side camera, the assistant-driver's-seat-side camera, the driver's-seat-side display, and the assistant-driver's-seat-side display are not activated;
when the first action is the fourth action detected by the driver's-seat-side detector, activate the driver's-seat-side camera and the driver's-seat-side display, without activating the assistant-driver's-seat-side camera and the assistant-driver's-seat-side display, to display an image taken by the driver's-seat-side camera; and
when the first action is the fourth action detected by the assistant-driver's-seat-side detector, activate the assistant-driver's-seat-side camera and the assistant-driver's-seat-side display, without activating the driver's-seat-side camera and the driver's-seat-side display, to display an image taken by the assistant-driver's-seat-side camera.

5. The image display apparatus according to claim 1, wherein
the driver's-seat-side detector is configured to detect a first operation performed on driver's-seat-side equipment of the vehicle by the occupant to get out of the vehicle;
the assistant-driver's-seat-side detector is configured to detect a first operation performed on assistant-driver's-seat-side equipment of the vehicle by the occupant to get out of the vehicle; and
the controller is configured to:
detect, as the first action, the first operation detected by the driver's-seat-side detector or the first operation detected by the assistant-driver's-seat-side detector in the state in which the driver's-seat-side camera, the assistant-driver's-seat-side camera, the driver's-seat-side display, and the assistant-driver's-seat-side display are not activated;
when the first action is the first operation detected by the driver's-seat-side detector, activate the driver's-seat-side camera and the driver's-seat-side display, without activating the assistant-driver's-seat-side camera and the assistant-driver's-seat-side display, to display an image taken by the driver's-seat-side camera; and
when the first action is the first operation detected by the assistant-driver's-seat-side detector, activate the assistant-driver's-seat-side camera and the assistant-driver's-seat-side display, without activating the driver's-seat-side camera and the driver's-seat-side display, to display an image taken by the assistant-driver's-seat-side camera.

6. The image display apparatus according to claim 3, wherein
the driver's-seat-side detector is configured to detect a second operation performed on driver's-seat-side equipment of the vehicle by the occupant to open the driver's-seat-side door;
the assistant-driver's-seat-side detector is configured to detect a second operation performed on assistant-driver's-seat-side equipment of the vehicle by the occupant to open the assistant-driver's-seat-side door; and
the controller is configured to:
when the second operation performed on the driver's-seat-side equipment of the vehicle is detected in the state in which the driver's-seat-side camera, the assistant-driver's-seat-side camera, the driver's-seat-side display, and the assistant-driver's-seat-side display are not activated, activate the driver's-seat-side camera and the driver's-seat-side display, without activating the assistant-driver's-seat-side camera and the assistant-driver's-seat-side display, to display an image taken by the driver's-seat-side camera; and
when the second operation performed on the assistant-driver's-seat-side equipment of the vehicle is detected in the state in which the driver's-seat-side camera, the assistant-driver's-seat-side camera, the driver's-seat-side display, and the assistant-driver's-seat-side display are not activated, activate the assistant-driver's-seat-side camera and the assistant-driver's-seat-side display, without activating the driver's-seat-side camera and the driver's-seat-side display, to display an image taken by the assistant-driver's-seat-side camera.

7. The image display apparatus according to claim 4, wherein
the driver's-seat-side detector is configured to detect a third operation performed on driver's-seat-side equipment of the vehicle by the occupant to move off the driver's-seat-side seat;
the assistant-driver's-seat-side detector is configured to detect a third operation performed on assistant-driver's-seat-side equipment of the vehicle by the occupant to move off the assistant-driver's-seat-side seat; and
the controller is configured to:
when the third operation performed on the driver's-seat-side equipment of the vehicle is detected in the state in which the driver's-seat-side camera, the assistant-driver's-seat-side camera, the driver's-seat-side display, and the assistant-driver's-seat-side display are not activated, activate the driver's-seat-side camera and the driver's-seat-side display, without activating the assistant-driver's-seat-side camera and the assistant-driver's-seat-side display, to display an image taken by the driver's-seat-side camera; and
when the third operation performed on the assistant-driver's-seat-side equipment of the vehicle is detected in the state in which the driver's-seat-side camera, the assistant-driver's-seat-side camera, the driver's-seat-side display, and the assistant-driver's-seat-side display are not activated, activate the assistant-driver's-seat-side camera and the assistant-driver's-seat-side display, without activating the driver's-seat-side camera and the driver's-seat-side display, to display an image taken by the assistant-driver's-seat-side camera.

8. The image display apparatus according to claim 1, wherein
the driver's-seat-side detector is configured to detect a touch of the occupant on an inside handle of the driver's-seat-side door of the vehicle;
the assistant-driver's-seat-side detector is configured to detect a touch of the occupant on an inside handle of the assistant-driver's-seat-side door of the vehicle; and
the controller is configured to:
when the touch of the occupant on the inside handle of the driver's-seat-side door is detected in the state in which the driver's-seat-side camera, the assistant-driver's-seat-side camera, the driver's-seat-side display, and the assistant-driver's-seat-side display are not activated, activate the driver's-seat-side camera and the driver's-seat-side display, without activating the assistant-driver's-seat-side camera and the assistant-driver's-seat-side display, to display an image taken by the driver's-seat-side camera; and
when the touch of the occupant on the inside handle of the assistant-driver's-seat-side door is detected in the state in which the driver's-seat-side camera, the assistant-driver's-seat-side camera, the driver's-seat-side display, and the assistant-driver's-seat-side display are not activated, activate the assistant-driver's-seat-side camera and the assistant-driver's-seat-side display, without activating the driver's-seat-side camera and the driver's-seat-side display, to display an image taken by the assistant-driver's-seat-side camera.

9. The image display apparatus according to claim 1, wherein
the driver's-seat-side detector is configured to detect a change in a state of the driver's-seat-side door of the vehicle from a locked state to an unlocked state;
the assistant-driver's-seat-side detector is configured to detect a change in a state of the assistant-driver's-seat-side door of the vehicle from a locked state to an unlocked state; and
the controller is configured to:
when the change in the state of the driver's-seat-side door from the locked state to the unlocked state is detected in the state in which the driver's-seat-side camera, the assistant-driver's-seat-side camera, the driver's-seat-side display, and the assistant-driver's-seat-side display are not activated, activate the driver's-seat-side camera and the driver's-seat-side display, without activating the assistant-driver's-seat-side camera and the assistant-driver's-seat-side display, to display an image taken by the driver's-seat-side camera; and
when the change in the state of the assistant-driver's-seat-side door from the locked state to the unlocked state is detected in the state in which the driver's-seat-side camera, the assistant-driver's-seat-side camera, the driver's-seat-side display, and the assistant-driver's-seat-side display are not activated, activate the assistant-driver's-seat-side camera and the assistant-driver's-seat-side display, without activating the driver's-seat-side camera and the driver's-seat-side display, to display an image taken by the assistant-driver's-seat-side camera.

10. The image display apparatus according to claim 1, wherein
the driver's-seat-side detector is configured to detect a change in a state of a seatbelt for a driver's-seat-side seat of the vehicle from a locked state to an unlocked state;
the assistant-driver's-seat-side detector is configured to detect a change in a state of a seatbelt for an assistant-driver's-seat-side seat of the vehicle from a locked state to an unlocked state; and
the controller is configured to:
when the change in the state of the seatbelt for the driver's-seat-side seat of the vehicle from the locked state to the unlocked state is detected in the state in which the driver's-seat-side camera, the assistant-driver's-seat-side camera, the driver's-seat-side display, and the assistant-driver's-seat-side display are not activated, activate the driver's-seat-side camera and the driver's-seat-side display, without activating the assistant-driver's-seat-side camera and the assistant-driver's-seat-side display, to display an image taken by the driver's-seat-side camera; and
when the change in the state of the seatbelt for the assistant-driver's-seat-side seat of the vehicle from the locked state to the unlocked state is detected in the state in which the driver's-seat-side camera, the assistant-driver's-seat-side camera, the driver's-seat-side display, and the assistant-driver's-seat-side display are not activated, activate the assistant-driver's-seat-side camera and the assistant-driver's-seat-side display, without activating the driver's-seat-side camera and the driver's-seat-side display, to display an image taken by the assistant-driver's-seat-side camera.

11. The image display apparatus according to claim 1, wherein
the driver's-seat-side detector is configured to detect a change in seating pressure generated by the occupant seated on a driver's-seat-side seat of the vehicle;
the assistant-driver's-seat-side detector is configured to detect a change in seating pressure generated by the occupant seated on an assistant-driver's-seat-side seat of the vehicle; and
the controller is configured to:
when the change in seating pressure generated by the occupant seated on the driver's-seat-side seat of the vehicle is detected in the state in which the driver's-seat-side camera, the assistant-driver's-seat-side camera, the driver's-seat-side display, and the assistant-driver's-seat-side display are not activated, activate the driver's-seat-side camera and the driver's-seat-side display, without activating the assistant-driver's-seat-side camera and the assistant-driver's-seat-side display, to display an image taken by the driver's-seat-side camera; and
when the change in seating pressure generated by the occupant seated on the assistant-driver's-seat-side seat of the vehicle is detected in the state in which the driver's-seat-side camera, the assistant-driver's-seat-side camera, the driver's-seat-side display, and the assistant-driver's-seat-side display are not activated, activate the assistant-driver's-seat-side camera and the assistant-driver's-seat-side display, without activating the driver's-seat-side camera and the driver's- seat-side display, to display an image taken by the assistant-driver's-seat-side camera.

\* \* \* \* \*